3,582,377
STEAM CURABLE COMPOSITION AND METHOD

Ronald M. Hays, Edina, and Iwao Iwasaki, Minneapolis, Minn., assignors to The Regents of the University of Minnesota, Minneapolis, Minn.
No Drawing. Filed Nov. 24, 1967, Ser. No. 685,297
Int. Cl. C04b 7/14
U.S. Cl. 106—117     7 Claims

ABSTRACT OF THE DISCLOSURE

An improved composition for and method of making precast autoclave-cured masonry articles based upon the discovery that part or all of the portland cement and/or silica flour heretofore used may be replaced by abundant natural and waste calcareous non-cement substances and mixtures thereof ground to cement fineness. Slags, lime, limestone and dolomite are exemplary of readily available replacement materials.

---

This invention relates to an improved composition for and method of making strong pre-cast high pressure steam cured masonry articles. In the recent past, pre-cast masonry products have been made commercially in manually operated molds, to form the uncured or "green" product, followed by low pressure or atmospheric steam curing at about 100 to 135 degrees F. for about ten to twelve hour and moist curing at normal temperature for about seven days. As the technology developed, the green product was formed by power operated machines using vibration or both vibration and pressure, followed by low pressure steam curing at about 70 to 90 degrees F. for about two hours and then at about 150 to 200 degrees F. for about ten to sixteen hours.

A the present time, in many modern plants where the volume of production warrants, the green product is formed by power operated machines followed by pre-setting by low pressure steam curing at about 130 degrees F. for about two hours and setting by high pressure steam curing at about 150 pounds per square inch gauge and about 350 degrees F. for about six hours. The high pressure steam curing takes place in an autoclave. Concrete products of the highest quality can be produced by high pressure steam curing in cylindrical steel autoclaves. Concrete products thus produced have minimum shrinkage and volume change, maximum strength in twenty-four hours and surfaces that will not effloresce or leach.

As technology improved, the proportion of cement in the masonry product decreased. Autoclave products use the least cement, a portion of the cement being replaced to advantage by silica flour. At the same time, the autoclave masonry product is superior in strength and shrinkage characteristics. The ingredients of normal mixes for various prior art processes described are shown below:

| Green block curing | Manual block low-pressure, parts | Power block Low-pressure, parts | Power block Autoclave, parts |
|---|---|---|---|
| Cement | 1 | 1 | 1 |
| Silica flour | | | 1 |
| Sand | 5 | 10 | 13 |
| Total | 6 | 11 | 15 |

The saving in the cost of materials coupled with the superiority of the product resulting from high pressure steam curing permits economical use in spite of the higher equipment costs. This is evidenced by the fact that a substantial percentage of pre-cast masonry products produced today are cured in an autoclave and the proportion is constantly increasing. It has now been discovered that further economies in the production of high quality autoclave cured masonry products can be achieved by the replacement of all or part of the cement and/or silica flour by abundant natural and waste calcareous non-cement materials or mixtures thereof ground to cement fineness.

The "non-cement" materials which may be substituted for cement and/or silica flour are abundant materials which have heretofore been believed to have little or no cementing properties. Some of the materials have been used in making cement but have not been known to possess adequate cementing properties in their normal state. Exemplary replacement materials which are readily available include slags, lime, limestone and dolomite, among others. Direct use of such materials ground to cement fineness in processes of making high pressure steam cured masonry products permits bypassing of the cement making process.

The setting and hardening process of concrete is not well understood and steam curing at high pressure and temperature has increased the complexity of this process. Setting and hardening of portland cement are thought to result from the hydration reaction of a number of constituents, such as tricalcium silicate, dicalcium silicate, tricalcium aluminate, tetracalcium aluminoferrite, etc. The rate of reaction is governed by its physical as well as chemical characteristics with the ultimate result being complete hydration. A typical constituent, e.g. tricalcium silicate, reacts with water according to

$$3\,CaO \cdot SiO_2 + nH_2O \rightarrow Ca(OH)_2 + xCaO \cdot ySiO_2 \text{ (aq)}$$

The hydrated calcium silicate thus formed is a gel-like mass in saturated lime solution. Hardening is attributed to the production of increasing amount of crystals and gel. On drying, it undergoes an irreversible contraction and reduction in water content as the gel converts into a more stable form, ultimately to calcium carbonate and hydrated silica, alumina and ferric oxide.

Autoclaving in high pressure steam causes a quartz sand to react with lime, thereby adding to the strength. It also transforms the gel into a non-colloidal material, and its capacity to hold water drops to a smaller value than when air dried.

It is known that an amorphous hydrated calcium monosilicate may be obtained by the action of lime water even on silica gel, and can absorb additional lime, presumably to the extent attained by some of the constituents of portland cement. Such a reaction may be accelerated in high pressure steam. Blast furnace, open hearth, BOF and electric furnace slags having basicity of about one or higher contain considerably less CaO than portland cement and their cementing action is expected to be weaker. However, masonry blocks have been prepared in which part or all of the portland cement and/or silica flour have been replaced by air-cooled blast furnace slag heretofore believed to have no, or very little, cementing properties such that it could not be used in the manufacture of masonry products. Similarly, other calcareous substances believed to have little or no cementing properties and, in fact, not having utility in prior art processes utilizing manual molding and moist or low pressure curing, or power molding and low pressure curing, may be used in partial or total replacement of portland cement in the manufacture of masonry products utilizing power molding and high pressure steam curing. The invention is described with reference to blast furnace slag and particularly air-dried blast furnace slag, although it must be understood that blast furnace slag has been selected merely as a readily available exemplary material and that other CaO-containing materials may be substituted for portland cement as well.

The cement substitute is reduced to a very fine state of division comparable to that of cement. It should be ground to a fineness to provide surface area between about 2,000 and 6,000 square centimeters per gram, as determined by the air permeability method. As with cements, a fine powder is able to coat the surfaces of grains of sand more completely so that an intimate contact of the components is assured. Because the reaction between the calcareous material and water takes place only at the surface of the solid particles, further action being hindered by the accumulation of the reaction product coating the unattacked material, the greater the surface exposed in proportion to its mass, the more rapid is the rate of hydration and the greater is the proportion of the calcareous material which reacts.

The composition, according to the present invention for making strong pre-cast high pressure steam cured masonry products, consists essentially of about 0 to ½ part portland cement, 0 to 2 parts silica flour, ½ to 4 parts of finely divided calcareous non-cement material and from 10 to 25 parts of aggregate, the aggregate being present in amount equal to about 85 to 95 percent of the total composition. Typical compositions, according to the present invention, are shown in the table below.

| Cement | ½ | ½ | 0 | 0 |
|---|---|---|---|---|
| Silica flour | 1 | 1 | 1½ | 0 |
| Replacement | 1½ | ½ | 2 | 4 |
| Sand | 23 | 24 | 24 | 24 |
| Total | 26 | 26 | 27½ | 28 |

The dry components are admixed with sufficient water to form a workable material for casting, as is well known in the art. Thorough mechanical mixing insures uniform distribution of the components through the mass. This material is cast into a mold of appropriate size and shape. Typical pre-cast masonry forms include building blocks, beams, slabs, jambs, lintels, steps, ornamental details and the like. The mix is compacted by vibration or by vibration and pressure to conform to the interior mold surface without voids. The green pre-cast units are then ordinarily stacked on racks for curing. The green units are pre-set by moist curing or preferably by low pressure steam curing at about 100 to 140 degrees F. for about one to three hours. When the autoclave is filled and closed, the air is vented while saturated steam is brought up to gauge pressure or temperature at least about 120 to 160 pounds per square inch gauge pressure or 350 to 370 degrees F. This takes about three hours. Then the articles are soaked at the maximum pressure for about five to eight hours, thick articles being steam heated and cured for a longer period than thin articles. After completion of curing, the steam is expelled quickly so that pressure drops to atmospheric within about ten to fifteen minutes. Vacuum may be used for the same purpose. The autoclaved products are ready for use on being cooled, no aging being necessary.

Blast furnace slag has been used to some extent in the manufacture of concrete. As reported in "The Chemistry of Cement" by F. M. Lea and C. H. Desch, blast furnace slag is used in the road and building industries in the production of cementing materials, as an aggregate in concrete, in the production of light-weight aggregate, and in the manufacture of slag wool for thermal insulation. The extent to which slag is used in cements varies in different countries. It is particularly well developed in several western European countries and several different types of cement are produced:

(1) Ground slag mixed with a suitable proportion of limestone is used as a raw material for the manufacture of portland cement.
(2) Granulated blast furnace slag is ground with portland cement clinker in various proportions. These are called portland blast furnace cements. In a recent development, the granulated slag is ground wet and added, either as a slurry or after drying, to the cement and aggregate in the concrete mixer.
(3) Granulated slag is ground with a small proportion of dead-burnt gypsum or anhydrite together with a smaller addition of cement or lime. These products are known as supersulphated cements.
(4) Ground granulated slag is mixed with hydrated lime. These are called slags cement.

The composition of blast furnace slag can vary over a wide range, depending on the nature of the ore, the composition of the limestone flux, and the kind of iron being made. These variations affect the relative contents of the four major constituents, lime, silica, alumina and magnesia, and also the amounts of the minor components. In general, the lime content may range from 30 to 50 percent, silica 28 to 38 percent, alumina 8 to 24 percent, magnesia 1 to 18 percent. Slag is removed from the blast furnace as a molten stream at a temperature of 1400 to 1500 degrees F. Its conversion into products suitable for various uses depends on subsequent processing. Widely different products are obtained according to the kind of process used in cooling the molten slag. When the slag is allowed to cool slowly it solidifies into a gray, crystalline, stony material known as air-cooled lump or dense slag. This forms the material used as road stone and as concrete aggregate. More rapid chilling with a limited amount of water applied in such a way as to trap steam in the mass produces a porous, honeycombed material which resembles pumice. This light-weight material is called foamed slag and after crushing and grinding is used as a light-weight aggregate. Slag which is to be used in the manufacture of the various slag cements is chilled very rapidly either by pouring into a large excess of water or by subjecting the slag stream to jets of water, or of air and water. The purpose is to cool the slag so quickly that crystallization is prevented, and it solidifies as a glass. This product is called granulated slag.

Lea and Desch state that ordinary air-cooled slag has no, or very little, cementing properties. Granulated slag alone also has a negligible cementing action but if some suitable activators are present, all except the more siliceous granulated slags show marked cementitious properties. Other personnel in the industry have flatly stated that ordinary air-cooled slag could not be used in the manufacture of masonry products.

EXAMPLES

In order to evaluate the effectiveness of replacing cement and silica flour with air-cooled slag, a number of experimental mixes were prepared and used to produce masonry blocks. In each instance, conventional industry procedures were followed and the experimental runs were made in an operating masonry manufacturing plant. The green block was formed by power operated machines followed by low pressure steam curing at 130 degrees F. for two hours, followed by high pressure steam curing at 150 pounds per square inch and 350 degrees F. for six hours, the high pressure steam curing taking place in an autoclave. The initial basis for the tests as shown in Examples I and II was a 50 percent reduction of the portland cement used in normal operating practice. The first test used what was considered at that time to be the maximum amount of slag and the second test used what was considered at that time to be the minimum amount of slag necessary to produce a masonry block equivalent to that produced in normal operating practice. Subsequent tests (IV) establish that greater amounts of slag could be used than originally anticipated and that the cement could be replaced completely, and (III) that both cement and silica flour could be replaced entirely by slag. The blast furnace slag used in this investigation was ordinary air-cooled slag. It had a composition as shown below.

| | Percent |
|---|---|
| $CaO$ | 40.2 |
| $SiO_2$ | 38.5 |
| $MgO$ | 9.3 |
| $Al_2O_3$ | 6.9 |
| $Fe$ | 2.4 |

This slag was crushed and finely ground to produce a product with a surface area of approximately 6000 cm.²/gm. It exhibits none of the properties of granulated slag, except that its overall composition is equivalent. This slag contains 9.3% MgO, which is higher than the less than 5% or preferably less than 3% normally desirable in blast furnace slags used for cements. This slag is typical of slag produced with modern blast furnace practice. Slag of this type is available in large tonnages and at present presents a solid waste disposal problem.

The compositions of the experimental mixes and the results of the experimental runs are outlined below:

|  | Pounds per batch | | | | |
| --- | --- | --- | --- | --- | --- |
|  | Normal mix | Experimental mix | | | |
|  |  | I | II | III | IV |
| Cement | 230 | 115 | 115 | 0 | 0 |
| Silica flour | 270 | 244 | 207 | 0 | 181 |
| Slag | 0 | 404 | 144 | 879 | 582 |
| Sand | 6,000 | 5,737 | 6,034 | 6,000 | 6,000 |
| Total | 6,500 | 6,500 | 6,500 | 6,879 | 6,763 |
| Average (Spec.) compressive strength (p.s.i.) | [1] 800–900 | 1,540 | 825 | 1,000 | 73[8] |

[1] Plant specifications for rapid in-plant testing correlated with ASTM specifications.

The mix of experiments III and IV appeared to contain too much water and therefore the mix was too sticky so that the blocks were not well formed. Even though the blocks were poorly formed, they had average compressive strength approaching or exceeding specification requirements.

It is apparent that many modifications and variations of this invention as hereinbefore set forth may be made without departing from the spirit and scope thereof. The specific embodiments described are given by way of example only and the invention is limited only by the terms of the appended claims.

We claim as our invention:

1. A high pressure steam setting composition consisting essentially of 0 to 1 part cement, 0 to 2 parts silica flour, ½ to 4 parts finely divided air cooled blast furnace slag and 10 to 25 parts aggregate, said aggregate being present in amount equal to 85 to 95 percent of the total composition.

2. A composition according to claim 1 further characterized in that said air cooled blast furnace slag is ground to a fineness to provide surface area between about 2,000 and 6,000 square centimeters per gram.

3. A method of making strong pre-cast autoclave-cured masonry articles which comprises admixing 0 to 1 part cement, 0 to 2 parts silica flour, ½ to 4 parts finely divided air cooled blast furnace slag and 10 to 25 parts aggregate with water to form a workable plastic mix, said aggregate comprising 85 to 95 percent of the solids of said mix, casting said mix into a mold and compacting, pre-setting the article and then subjecting to high pressure steam to cure the article.

4. A method according to claim 3 further characterized in that said plastic mix is compacted in the mold by vibrating.

5. A method according to claim 3 further characterized in that the article is pre-set by subjecting to low pressure steam curing at about 100 to 140 degrees F. for one to three hours.

6. A method according to claim 3 further characterized in that the article is cured by subjecting to high pressure steam curing at at least about 350 to 370 degrees F. and at least about 120 to 160 pounds per square inch gauge pressure for about five to eight hours.

7. A strong pre-cast masonry article resulting from the process of claim 3.

References Cited
UNITED STATES PATENTS

| | | | |
| --- | --- | --- | --- |
| 2,584,604 | 2/1952 | Mendius | 106—120 |
| 2,898,220 | 8/1959 | Ulfstedt et al. | 106—120 |
| 2,987,407 | 6/1961 | Ulfstedt et al. | 106—117 |
| 3,202,522 | 8/1965 | Yang et al. | 106—117 |
| 3,226,242 | 12/1965 | Huettemann | 106—120 |
| 3,230,103 | 1/1966 | Minnick | 106—117 |
| 2,449,140 | 6/1969 | Yang | 106—117 |

JAMES E. POER, Primary Examiner

U.S. Cl. X.R.

106—97, 98, 118, 120

PO-1050
(5/69)

UNITED STATES PATENT OFFICE
CERTIFICATE OF CORRECTION

Patent No. 3,582,377           Dated June 1, 1971

Inventor(s) Ronald M. Hays and Iwao Iwasaki

It is certified that error appears in the above-identified patent and that said Letters Patent are hereby corrected as shown below:

Column 2, line 66, "air-dried" should be --air-cooled--.

Column 5, line 24, "73 " should be --738--.
                       8

Signed and sealed this 19th day of October 1971.

(SEAL)
Attest:

EDWARD M. FLETCHER, JR.      ROBERT GOTTSCHALK
Attesting Officer               Acting Commissioner of Patents